United States Patent [19]

DiMatteo

[11] Patent Number: 4,745,989

[45] Date of Patent: May 24, 1988

[54] VALVE FOR DRAINING AUTOMATIC TRANSMISSION FLUID AND METHOD OF USING SAME

[76] Inventor: John G. DiMatteo, 2807 W. Ave. M-12, Lancaster, Calif. 93536

[21] Appl. No.: 63,546

[22] Filed: Jun. 17, 1987

[51] Int. Cl.[4] .......................................... F01M 11/04
[52] U.S. Cl. .................................. 184/1.5; 137/322; 165/71
[58] Field of Search ..................... 137/322; 184/1.5; 165/71

[56] References Cited

U.S. PATENT DOCUMENTS

| 2,685,347 | 8/1954 | Busby | 184/1.5 |
| 3,447,636 | 6/1969 | Bonfilio | 184/1.5 |

FOREIGN PATENT DOCUMENTS

| 3041373 | 6/1981 | Fed. Rep. of Germany | 184/1.5 |
| 37513 | 3/1980 | Japan | 184/1.5 |

Primary Examiner—Robert G. Nilson
Attorney, Agent, or Firm—Milton S. Gerstein

[57] ABSTRACT

A valve for use in changing automatic transmission fluid, obviating the need of removing the oil pan. The valve is interposed in the hose line connecting the transmission fluid outlet to the cooler inlet. The valve has an interior, control slide to allow, in its first state thereof, the normal flow of the fluid from the transmission to the cooler, and, in the second state thereof, diverts the flow from the transmission to a drain outlet for deposit of the old oil in a container for eventual disposal. In using the valve, a desired amount of old oil is drained, and simultaneous therewith new oil is added to the transmission. The control slide is held in its first state by a spring, and is held in its second state by a hollow push-rod connected to the dispensing outlet of a container, the push-rod and its associated mounting element allowing for the through-flow of the old oil directly to the container.

15 Claims, 2 Drawing Sheets

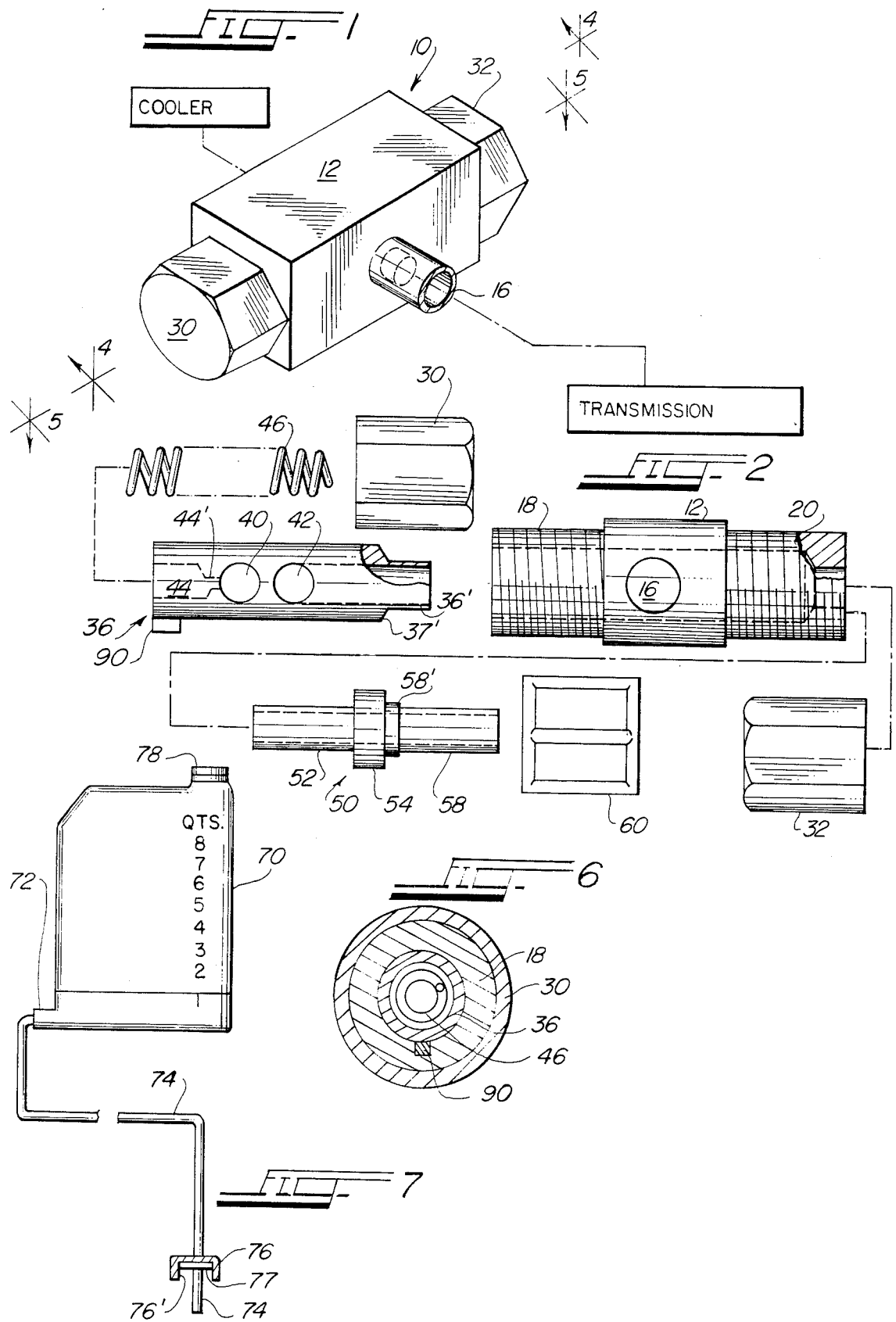

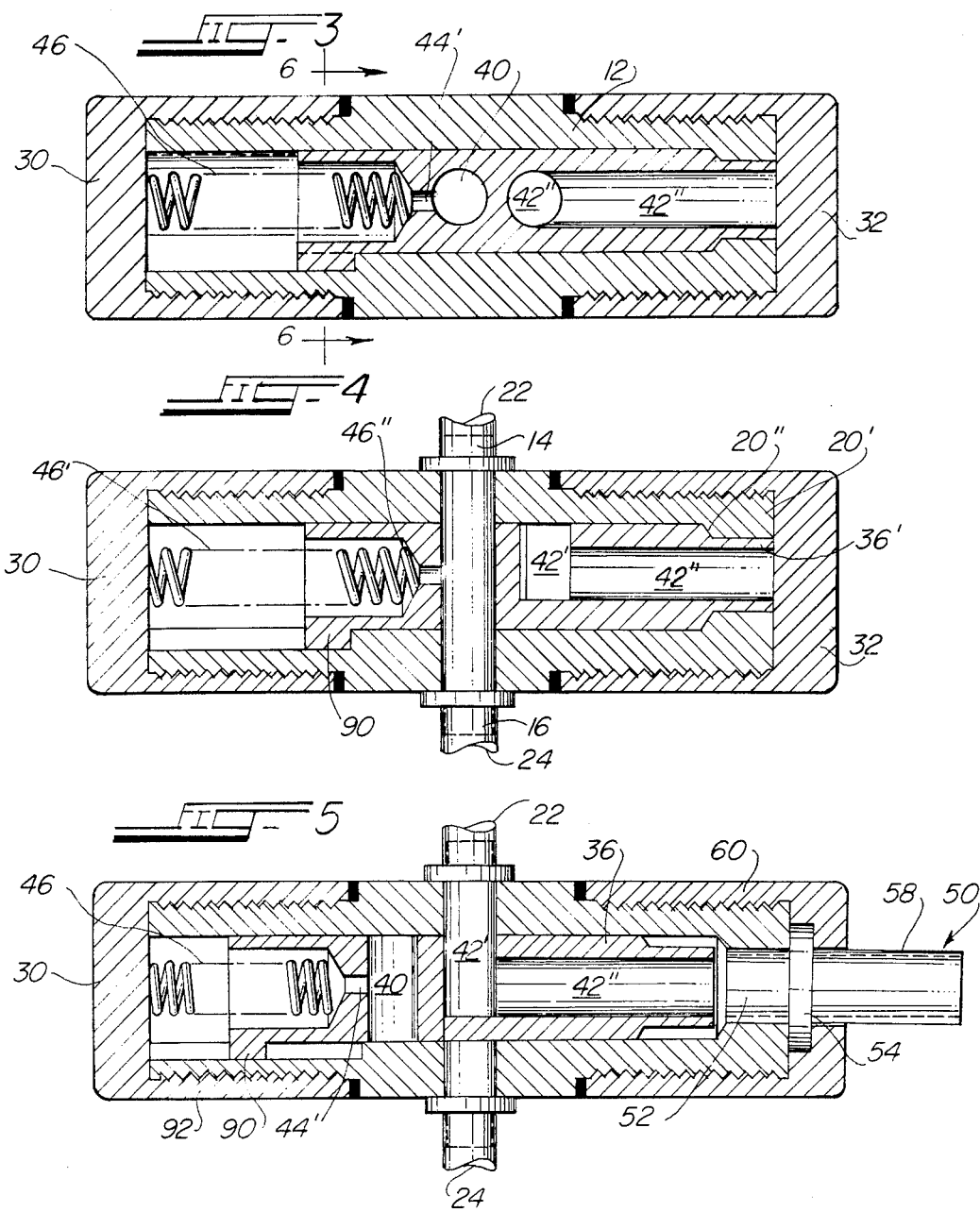

4,745,989

VALVE FOR DRAINING AUTOMATIC TRANSMISSION FLUID AND METHOD OF USING SAME

BACKGROUND OF THE INVENTION

The present invention is directed to a valve for use in draining old transmission oil from an automatic transmission, and for refilling the automatic transmission with new fluid, and a method for using the valve to drain the old fluid and add the new fluid. Current practice of changing automatic transmission oil requires a relatively long and somewhat difficult task, since the vehicle usually must be raised, the transmission pan removed, and the old oil allowed to drip out into container for subsequent disposal. The removal of the pan is the most difficult and time-consuming part of the task. Due to the expense and effort involved, many automatic transmissions are not timely serviced.

SUMMARY OF THE INVENTION

It is, therefore, the primary objective of the present to provide a valve and method of using the valve in order to allow for easy, quick, and inexpensive draining of old automatic transmission fluid and the substantially simultaneous refilling thereof with new fluid.

It is another objective of the present invention to provide such a valve that is simple to install, and which is simple to use when draining the old fluid.

It is yet another objective of the present invention to provide a valve that is permanently affixed to the vehicle and used only during transmission oil change.

It is another objective of the present invention to provide such a valve that may be used in conjunction with specially-provided containers into which the old fluid is drained, which container includes its own fitting for attaching to a drain outlet of the valve during the oil change.

It is an objective of the present invention to provide a method of using the valve such that the draining of the old fluid is carried out while refilling the transmission with new fluid, such that any amount of old fluid may be drained and removed with the concomitant equal amount of new, clean fluid added.

The valve of the present invention is provided with a main body or housing having a hollow interior. At a first end of the housing there is provided a first port and at the second, diametrically-opposed end of the housing there is provided a second port, the housing being mounted between the hose connecting line coupling the transmission fluid outlet to the transmission cooler input, with the first and second ports fluidly coupling the valve between the transmission and the cooler so that under normal operating conditions, fluid passes through the valve housing into the first port and out of the second port.

The valve housing is also provided with a pair of diametrically-opposed tubular extensions having exterior threads, these tubular extensions having central longitudinal axes that are collinear and at right angles to the collinear axes of the first and second ports. Positioned within the housing is a control slide, or spool, which is spring biased toward one of the tubular extensions. The control slide has a pair of control passageways, a first one that allows normal flow of the fluid through the housing from the first port to the second port, and a second control passageway formed into a pair of right-angle leg sections that during the changing of the fluid diverts the old fluid in the connecting hose line from the outlet of the transmission to one of the tubular extensions for the subsequent draining therethrough into a container. A special coupling attachment provided with the container allows for secure connection between container and housing, which special coupling attachment is used to slide the control slide against the bias of the spring to bring the second, right-angle passageway into alignment with the first port of the housing serving as the inlet thereof.

According to the method of using the valve and changing the fluid, the special coupling attachment is inserted into one of the tubular extensions after removing the closure cap thereof, which forces the control slide or spool against the spring to slide to align the second bent passageway with the inlet port. Simultaneous with this, a another container filled with new fluid is used and the fluid therein poured into the dipstick tube. Each container is provided with gradations, so that after a certain amount of old fluid has been drained into the first container, and the amount thereof noted by the gradations, the same amount of new fluid is allowed to be poured into the transmission. When the desired amount is drained and an equal amount of new fluid added, the engine is turned off. When the special coupling attachment is inserted into the tubular extension, the first passageway of the control slide or spool is brought out of linear alignment with the first and second ports of the housing while the second passageway is brought into alignment with the tubular extension and the inlet port, to thereby divert the old fluid from the first inlet port to the tubular extension and outward therefrom through the special coupling attachment's hollow interior, and finally to the exterior of the container, for subsequent disposal. The special coupling attachment is also provided with a threaded nut to secure it in place on the threaded tubular extension, so that the slide or spool is retained in its diverting state against the force of the spring. After the changeover has occurred, the nut is removed and replaced by another nut used during non-changeover periods, so that the tubular extension is closed off. The other tubular extension is used to allow for sliding movement therein of the control slide during changeover, and has a slot or groove for receiving therein an ear of the slide to guide the movement thereof.

BRIEF DESCRIPTION OF THE DRAWING

The invention will be more readily understood with reference to the accompanying drawing, wherein:

FIG. 1 is a perspective view of the valve of the invention;

FIG. 2 is an assembly view showing the arrangement of parts of the valve of FIG. 1;

FIG. 3 is a cross-sectional view taken along line 3—3 of FIG. 1;

FIG. 4 is a cross-sectional view taken along line 4—4 of FIG. 1;

FIG. 5 is a cross-sectional view similar to FIG. 4, and showing the control slide of the valve in the second position thereof for allowing draining of a transmission;

FIG. 6 is a cross-sectional view taken along line 6—6 of FIG. 3; and

FIG. 7 is a plan view showing the translucent container of the invention used in filling new fluid to a transmission with a special attachment thereof for extending into the transmission filling tube.

DETAILED DESCRIPTION OF THE INVENTION

Referring now to the drawings in greater detail, the valve of the invention is shown in FIG. 1 and indicated generally by reference numeral 10. The valve 10 is a separate product that may be used with all vehicles having automatic transmissions. The valve 10 is used to retrofit any automatic transmission so that when it is desired to change the fluid by draining the old fluid and adding new fluid, the valve 10 may be actuated to cause the desired amount of old fluid to be drained while new fluid is added to the transmission through the dip-stick casing thereof. Most recreational vehicles and pick-up trucks having automatic transmissions are provided with a separate cooler for the transmission fluid, the fluid exiting from the outlet of the transmission pump and sent to the inlet of the transmission cooler via a hose or similar connection for cooling. For automobiles, and the like, the transmission cooler is a section of the radiator, with appropriate connections being provided between the transmission pump outlet and the cooler inlet of the section of the radiator. The present invention may also be used for connections that are not hoses, with the only difference being the type of coupling mounting the valve 10 between the transmission pump outlet and the cooler inlet.

The valve 10 includes a main body portion 12 preferably of quadrilateral cross section, although circular cross section may also be employed. The main body portion 12 defines a hollow interior and has projecting, from its four vertical side walls, ports or tubes 14, 16, 18, and 20. The ports 14 and 16 are main ports and are generally circular hollow tubes extending from opposite vertical walls of the main body portion 12, as best seen in FIGS. 4 and 5. These main ports 14 and 16 are in fluid communication with the hollow interior of the main body portion, and are used for permanently interposing the valve 10 in the fluid line connecting the automatic transmission pump's outlet to the transmission fluid cooler, with the main port 16 in fluid communication with the outlet of the transmission and the main port 14 in fluid communication with the inlet of the cooler. The main ports 14 and 16 are coupled by conventional means to respective hose or pipe sections 22 and 24 shown in FIGS. 4 and 5 interconnecting the cooler and the transmission. These hose or pipe sections 22 and 24 are formed by dividing the existing hose or pipe section into two parts and interposing the valve therebetween, or by providing two new separate hose or pipe sections. During normal use of the valve 10, when the draining and changing of the transmission fluid is not carried out, the main ports 14, 16 are in fluid communication with each other to allow the flow of transmission fluid directly therethrough in the normal fashion.

The ports 18 and 20 are secondary ports, and in the preferred embodiment are constituted by hollow, exterion-threaded circular sleeves. One of these secondary ports 20 is used for draining the old fluid from the transmission as described below in greater detail. Each secondary port 18, 20 is normally closed off by a closure nut or cap 30, 32, with appropriate washers therefor, so that during normal usage, the fluid flows directly through the main ports 14, 16. The cap 32 is removed when draining the old fluid to allow for the insertion into the secondary port 20 of a drain plug used to redirect the flow of fluid through the main port 14 to the secondary port 20.

Mounted within the hollow interior of the main body portion 12 is a control slide or spool 36 in which is formed a pair of passageways 40, 42. The passageway 40 is a through-opening that connects the main port 14 to the main port 16 when the control slide 36 is in its first, normal position or state shown in FIG. 4. The second passageway 42 is a bent or right-angle passageway having a first inlet portion 41' extending parallel to the first passageway 40, and second outlet portion 42" extending angularly from the first inlet portion 42'. The second passageway is used when draining the old fluid from the transmission by connecting the main port 14 to the secondary port 20, in the manner to be described. The control slide 36 also includes a cavity 44 at one end thereof for receiving therein a portion of a spring 46. The spring 46 biasses the control slide 36 toward the port 20. One end 46' of the spring abuts against the inner surface of the cap 30 of the secondary port 18, while the other end 46" abuts against the substantially closed end of the cavity 44, as best seen in FIGS. 4–6. The end 36' of the control slide, remote from the end thereof in which the cavity 44 is formed, is reduced in size, and forms a transition region defined by a sloping annular surface 37, which surface 37 limits the rightward movement of the control slide 36, when viewing FIG. 4. The interior of the secondary port 20 is formed with an enlarged annular rim 20' that defines a transitional region defining similarly canted sloping annular surface 20" that limits the rightward movement of the control slide 36 by the abutment thereagainst of the sloping annular surface 37. As can be seen in FIGS. 4 and 5, the end 36' fits snugly within the hollow interior defined by the annular surface 20', with the annular sloping surfaces 20" and 37 cooperating to define a limit stop to the rightward movement of the control slide. The spring 46 holds the slide 36 in this first position or state until acted upon by the drain plug to be described below. In this first position of the slide 36, the first passageway 40 is in linear alignment with the main ports 14, 16, as best seen in FIGS. 4 and 5, with the first inlet portion 42' of the second passageway out of alignment with the main port 14. The control slide 36 also includes a narrow, short interconnecting passage 44' between the substantially closed end of the cavity 44 and the first linear passageway 40. This passage 44' allows for the flow of the transmission oil from the cavity to the passageway 40, since transmission oil is positioned in the cavity 44 at all times for lubrication purposes. The passage 44' also allows for the old oil to be forced out therefrom when the control slide 36 is moved to its second state shown in FIG. 5.

In order to drain the old fluid from transmission, the threaded cap 32 is removed, after which it is necessary to slide the control slide or spool 36 leftward when viewing FIGS. 3–5 so as to bring into alignment the first portion 42' of the second passageway 42 with the main port 14 so as to divert the flow of fluid outwardly through the secondary port 20. To accomplish this leftward movement, and the retention of the control slide in the second state thereof, there is provided a drain plug or connection 50 best seen in FIGS. 2 and 5. The drain plug 50 consists of a first hollow tube 52 having a slightly smaller diametric extension than the opening formed by the annular surface 20' of the secondary port 20 so that the hollow tube 52 may be inserted therein, in the manner shown in FIG. 5. Integral with the hollow tube 52 is an enlarged flange 54 which abuts up against the outer surface of the secondary port 20, the flange 54 having a diametric extension larger than the outer diametric extension of the tube forming the secondary port 20. As can be seen in FIG. 5, the diametric extension of the hollow tube 52 is approximately the same as the reduced end section 36' of the control slide, so that, when the hollow tube 52 is inserted into the secondary port 20, it forces the control slide or spool 36 to move leftward, against the bias of the spring 46. The length of the hollow tube 52 is such that it forces the control slide leftward a specific distance so as to align the section 42' of the second passageway 42 with the opening of the main port 14, to thus divert the flow of fluid out through the interior of the hollow tube 52. The drain plug 50 also includes an outer hollow tubular member 58 integral with the exterior surface of the flange 54, through which tubular member 58 the drained fluid flows to a storage container for subsequent disposition. In the preferred embodiment, the tubular member is fixedly coupled to a hose connection of a container, such as a container similar to that shown in FIG. 7, so that the old fluid is drained directly into the container. The hose connection is fixedly connected to the tubular member 50 at one end and is attached at its other end to the entrance opening of the container. In order to keep the control slide 36 in its second state, a B-nut or cap 60 is provided having interior threads for mating with the exterior threads of the tube of the secondary port 20. The B-nut has a central opening through which projects the tubular member 50, as shown in FIG. 5. The cap 60 firmly holds the flange, and therefore the hollow tube 52 in place, to retain the control slide in its second state shown in FIG. 5. When the draining of the old fluid is completed, the cap 60 is removed, and the associated drain plug 50, to allow the control slide 36 to return to its normal state under the biassing force of the spring 46.

In using the valve 10 of the invention for draining and filling the transmission fluid, the cap 32 is removed and the drain plug 50 inserted to align the second passageway 42 with the main port 14. Substantially simultaneous with the draining, new fluid is added to the transmission via the filling tube thereof in which is stored the transmission dip stick. In FIG. 7 there is shown a container 70 that is made of translucent material, in which there are provided gradations for indicating the amount of liquid therein. The container 70 is used for storing new, clean fluid to be used for the transmission during changeover. A container similar to the container 70 is also provided for receiving the old, drained fluid. The gradations in the container for storing the old, drained fluid indicate the amount of old fluid drained form the transmission. Therefore, during such draining, one may visually gauge the amount of fluid drained, and add the very same amount of new fluid to the transmission by the gradations on the container 70. Thus, the substantial simultaneity of the draining and filling may be understood. According to the method of the invention, any amount of old fluid and new fluid may be drained and added, respectively, as opposed to prior art methods which required the removal of the pan and the concomitant drainage of most of the old oil. After visually gauging the desired amount of old oil drained, the engine is turned off, to thus shut down the transmission pump, to thereby stop the further draining of the old fluid. After the last amounts of oil are drained away, which will occur a short while after the pump has stopped, there can be seen the exact amount of old oil drained, so that the exact same amount of new, clean oil may be added, with the gradations of the container 70 allowing such exactitude.

The container 70 shown in FIG. 7 is provided with a lower, spout or opening 72 through which the new, clean fluid exits on its way to the filler tube of the transmission. Coupled to the spout or opening 72 is a hose coupler 74 having adjacent is free end a threaded closure member 76 which is used to close off the main spout or opening 78 of the container 70 when the container is not being used. The closure member 76 has interior threads 76' that cooperatively mate with conventional exterior threads of the conventional spout 78. Extending through the closure member 76 is the free end 74' of the hose coupler 74, which free end may be inserted into the hollow interior of the transmission's filler tube to thereby fill the transmission with the new fluid. The closure cap has a lower reinforcing disc 77 that abuts against the upper mouth of the filler tube to limit the insertion of the free end 74' therein. In using the container 70, it is held at an elevation such that the spout 72 is higher than the free end 74', so that the new, clean fluid flows into the filler tube. The gradations on the container allows for the same amount of new fluid to be added as that drained by the valve 10.

Regarding the nut or cap 60, in a modification thereof, it may be held permanently adjacent to the flange 54 by a retaining ring seated in an annular groove formed in the outer surface wall of the slightly-enlarged section 58' of the tubular member 58.

To provide for non-rotational sliding movement to the control slide 36, the secondary port 18 is provided with a channel or groove 92 in which rides a tongue or ear 90 projecting downwardly and integrally connected with the end of the control slide adjacent to the port 18. In the preferred of the invention, the channel or groove 90 extends the full length of the tube of the secondary port 18, and extends into the main body portion's wall thickness. The cap 30, when removed, allows for easy removal of the control slide 36, for replacement purposes, or the like.

In a preferred embodiment of the invention, the length of each main port and the main body portion is 1.0 inches, with the length of the groove 92 being 1.125 inches, and 0.062 inches wide and deep. each passageway is circular with a diameter of 0.308 inches. The circular cavity 44 has a diameter of 0.343 inches, with the passage 44 having a diameter of 0.062 inches. The bore of the secondary port 20 is 0.5 inches, with the reduced bore defined by region 20' being 0.4375 inches in diameter and 0.25 inches long. The control slide 36 is 2.250 inches long, with the length of the second passageway 42 being 1.1 inches from the center of the first inlet end 42'. Spring 46 is 1.5 inches long with a diameter of 0.275 inches. Each secondary port's tubular element has an outer circular diametric extension of 0.875 inches. The over width of the main body portion, as taken in the direction between the two main ports 14, 16 is 1.5 inches.

While a specific embodiment of the invention has been shown and described, it is to be understood that numerous changes and modifications thereof may be made without departing from the scope, spirit and intent of the invention as set forth in the appended claims. The cap 76 is preferably rotatably mounted relative to the hose 74 and disc 77 so that it may rotated onto the upper spout. The disc 77 serves as a seal, with the free end 74' of the hose being adhesively connected to the disc through a central hole of the disc. The cap 76 also has a hole through which projects the portion of the hose line 74 thereat. The diametric extension of the disc 77 is slightly greater than the opening of the upper spout to allow for the tight closure thereof.

What is claimed is:

1. A valve in combination with a vehicular automatic transmission and transmission cooler, comprising:

a valve comprising a main housing having a hollow interior volume through which may flow a fluid, said main housing having a first, second, third and fourth side wall;

slide control means mounted for sliding movement in said interior volume, said slide control means comprising a first passageway, and a second passageway spaced from said first passageway, said first passageway allowing for flow of fluid through said slide control means along a first path, and said second passageway allowing for flow of fluid along a second path spaced from said first path;

said main housing having a first inlet port means formed in said first side wall, and a second outlet port means formed in said second side wall in fluid communication with said first inlet port means via said hollow interior volume;

said main housing further comprising at least one additional port means at said third side wall, said slide control means having an end positioned adjacent said at least one additional port means;

spring means for biasing said slide control means into a first state thereof where said first passageway fluidly connects said first and second port means so that fluid may pass therethrough, said first state preventing the flow of fluid through said second passageway;

means operatively associated with said at least one additional port means for overcoming the force of said spring means for positioning said slide control means in a second state thereof where said second passageway fluidly connects said first inlet port means with said at least one additional port means to direct the flow of fluid outwardly through said at least one additional port means;

a vehicular automatic transmission and cooler therefor;

means for connecting the outlet of said automatic transmission to the inlet of said cooler for circulating the automatic transmission fluid through said cooler;

said valve being interposed with said means for connecting such that the automatic transmission fluid flows through said valve during passage to said cooler;

said means for connecting comprising a first portion having a first end connected to said outlet of said transmission, and a second end; and a second portion having a first end connected to said inlet of said cooler and a second end;

said second end of said first portion being coupled to said first inlet port means of said main housing, and said second end of said second portion being coupled to said second outlet end of said main housing, whereby said valve may be used to empty old fluid from the transmission while new oil is being added.

2. The valve according to claim 1, wherein said main housing comprises a first and second additional port means, said first additional port means being positioned at said third side wall, and said second additional port means being positioned at said fourth side wall; said first and second side walls of said main housing being separated by said third and fourth side walls, and said third and fourth side walls being separated by said first and second side walls.

3. The valve according to claim 2, wherein said first passageway is linear, and said second passageway is nonlinear; said second passageway fluidly connecting said first additional port means with said second outlet port means when said slide control means is in said second state thereof.

4. The valve according to claim 3, wherein said second passageway comprises a first portion substantially parallel to said first passageway, and a second passageway extending at an angle with respect to said first passageway, said main housing having a substantially rectilinear cross-section, said first and second side walls being parallel to each other, and said third and fourth side walls being parallel to each other and perpendicular to said first and second side walls.

5. The valve according to claim 2, wherein each said additional port means comprises a hollow tubular extension projecting from a respective said third and fourth side wall, one said tubular extension having cooperating means formed in the surface thereof for retaining thereby said means for overcoming the force of said spring means.

6. The valve according to claim 5, wherein each said hollow tubular extension comprises said cooperating means, said cooperating means comprising threads formed on the outer surface of the respective said tubular extension.

7. The valve according to claim 5, further comprising nut means for closing off said one tubular extension at the outer end thereof when said slide control means is in said first state thereof, said nut means being removed when said slide control means is in said second state thereof.

8. The valve according to claim 1, wherein said means for overcoming the force of said spring means comprises a first hollow member insertable into said at least one additional port means, retaining means connected to said first hollow member for securing said first hollow member in place, said first hollow member when inserted into said at least one additional port means forcing said slide control means away therefrom to bring said slide control means into said second state thereof, and a second hollow member connected to said retaining means and extending away from said at least one additional port means, said second hollow member being connectable to a container for directing fluid thereto.

9. The valve according to claim 8, wherein said at least one additional port means comprises cooperating means for receiving said retaining means, said retaining means and said cooperating means comprising threads.

10. The valve according to claim 9, wherein said slide control means comprises an elongated body having a length and width, said first passageway being formed in said elongated body along the width thereof, and said second passageway being nonlinear and being formed partially along said width and partially along said length.

11. The valve according to claim 10, wherein said elongated body comprises a hollow cavity in which is positioned a portion of said spring means, said hollow cavity having an open end communicating exteriorly of said control slide means so that said spring means may protrude outwardly therefrom; said main housing comprising a first and second additional port means axially collinear, said elongated body sliding along said collinear axis between said first and second states thereof; said main housing and said elongated body having interconnecting means for allowing the sliding movement of said elongated body and preventing rotational movement thereof.

12. The valve according to claim 11, wherein said elongated member further comprises a connecting hole between said first passageway and said hollow cavity so that fluid in said hollow cavity may exit.

13. The valve according to claim 1, in further combination with at least one container, said container being used for receiving therein the used, drained oil from said transmission; said container having a plurality of gradations thereon to indicate various volumes, in order to indicate the amount of used oil stored therein; said container having a dispensing opening; said means for overcoming the force of said spring means having a hollow interior; means for fluidly connecting said dispensing opening to said means for overcoming the force of said spring means so that the drained oil from said transmission flows through said means for overcoming the force into and through said means fluidly connecting and into said container.

14. A method of changing transmission fluid from an automatic transmission, wherein there is provided a valve interposed in the means connecting the transmission outlet to the cooler inlet, the valve taking on two different states thereof, one for draining the fluid and one for allowing normal passage of the fluid to the cooler from the transmission, said method comprising:
 (a) controlling said valve to position it in the second state thereof, said step comprising diverting the fluid flowing from the transmission to the cooler so as to take on a second path avoiding the cooler;
 (b) draining a desired amount of fluid from the transmission through the valve;
 (c) substantially simultaneous with said (b), pouring new fluid into the transmission in approximately the same amount as the used oil drained during said (b);
 (d) controlling the valve to position in the first state thereof to allow for normal flow of the transmission fluid from the transmission to the cooler, said step inherently including concluding said step (b).

15. The method according to claim 14, further comprising: (e) running the engine of the vehicle whose transmission oil is being changed during said steps (a), (b), and (c).

* * * * *